May 26, 1959     H. J. TROCHE     2,888,149

DERRICKS

Filed Sept. 25, 1956     9 Sheets-Sheet 1

INVENTOR.
HERMAN J. TROCHE
BY
*George W. Saywell*
ATTORNEY

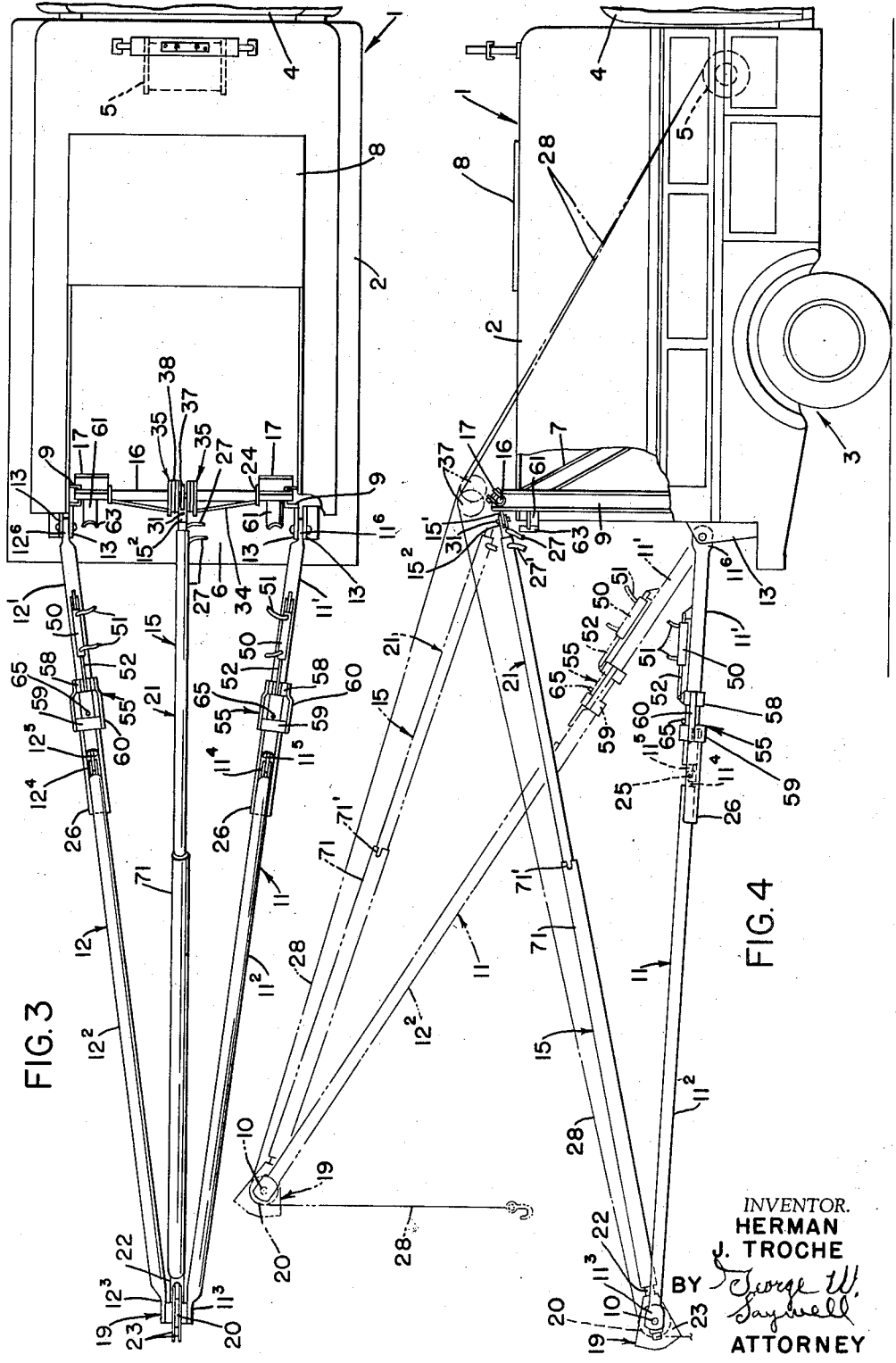

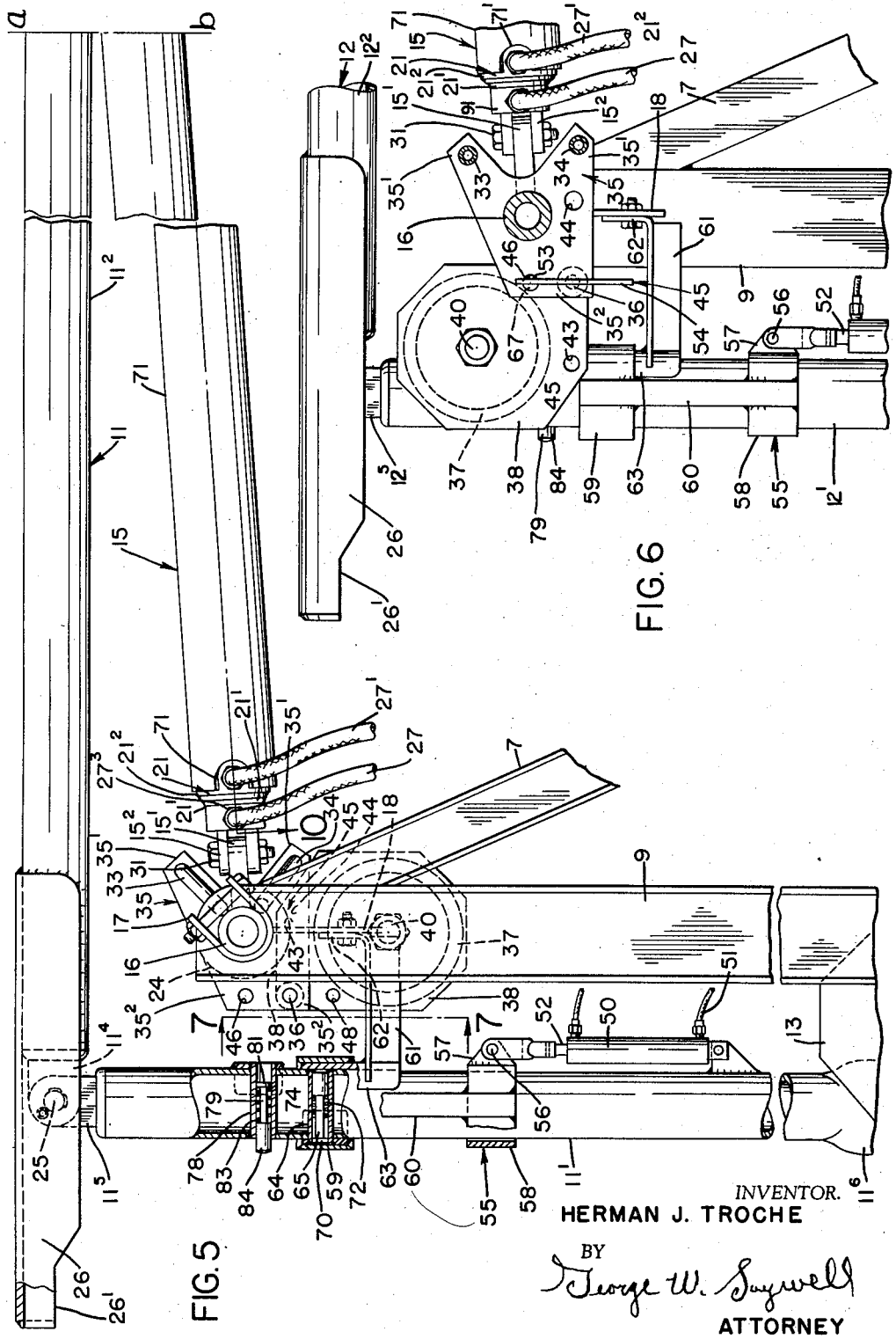

May 26, 1959     H. J. TROCHE     2,888,149
DERRICKS
Filed Sept. 25, 1956     9 Sheets-Sheet 4
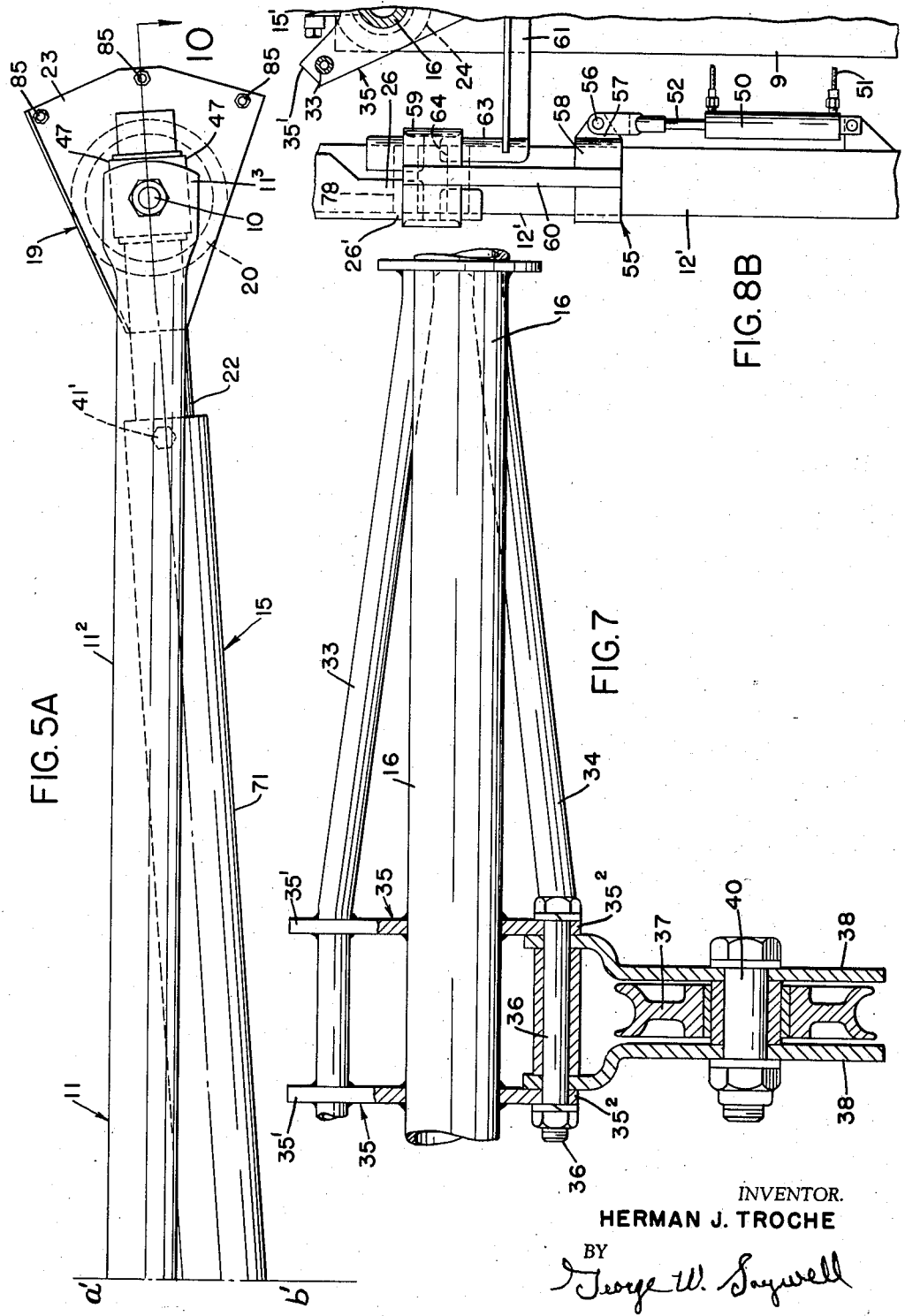
INVENTOR.
HERMAN J. TROCHE
BY
George W. Sagwell
ATTORNEY May 26, 1959 H. J. TROCHE 2,888,149
DERRICKS
Filed Sept. 25, 1956 9 Sheets-Sheet 5

INVENTOR.
HERMAN J. TROCHE
BY
George W. Saywell
ATTORNEY

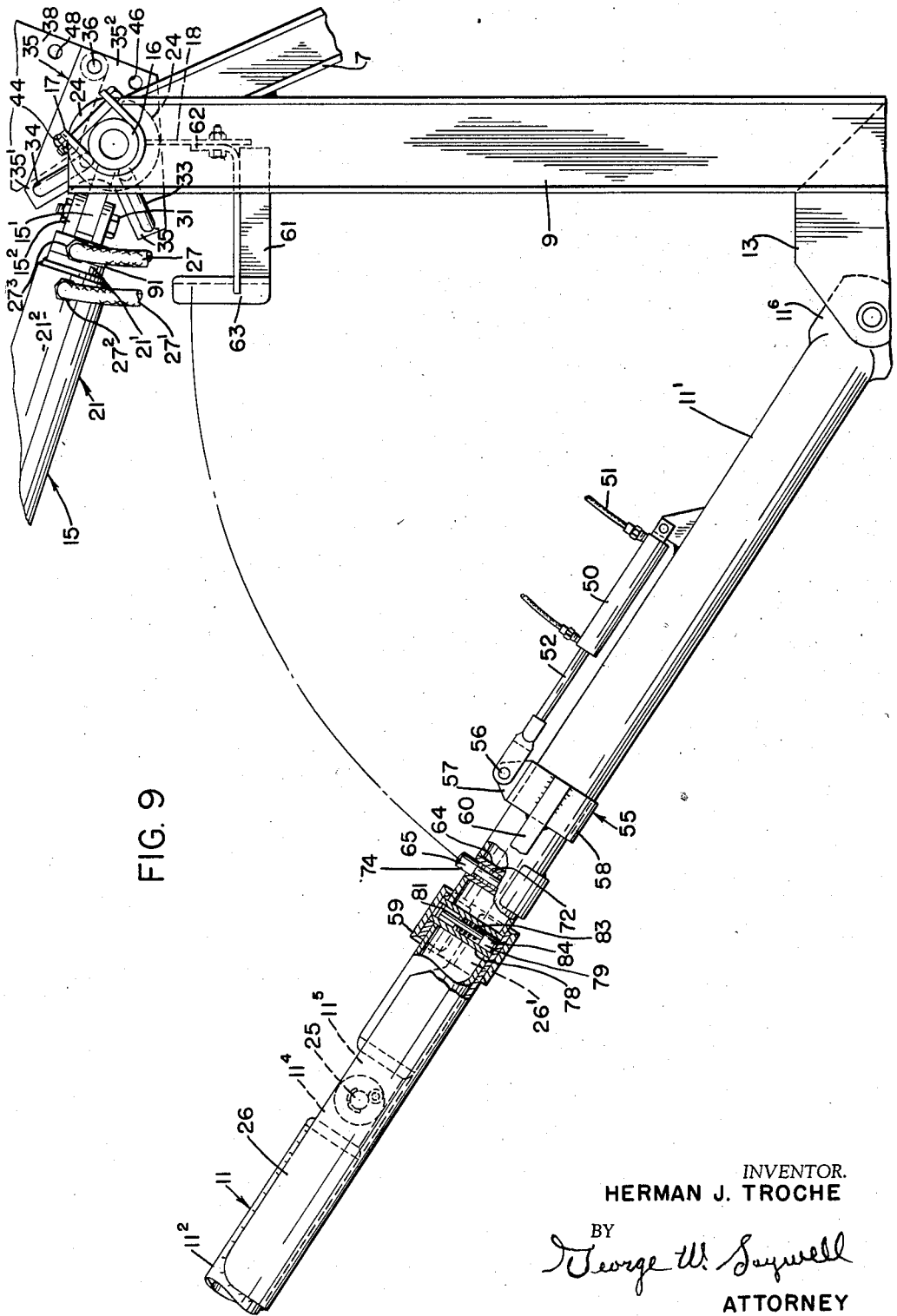

May 26, 1959     H. J. TROCHE     2,888,149
DERRICKS
Filed Sept. 25, 1956     9 Sheets-Sheet 7
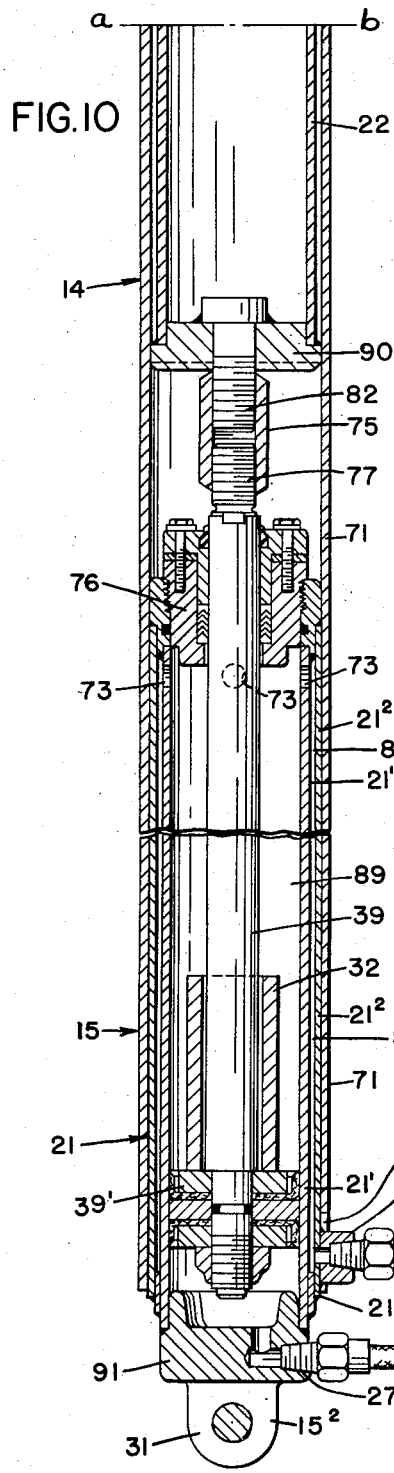
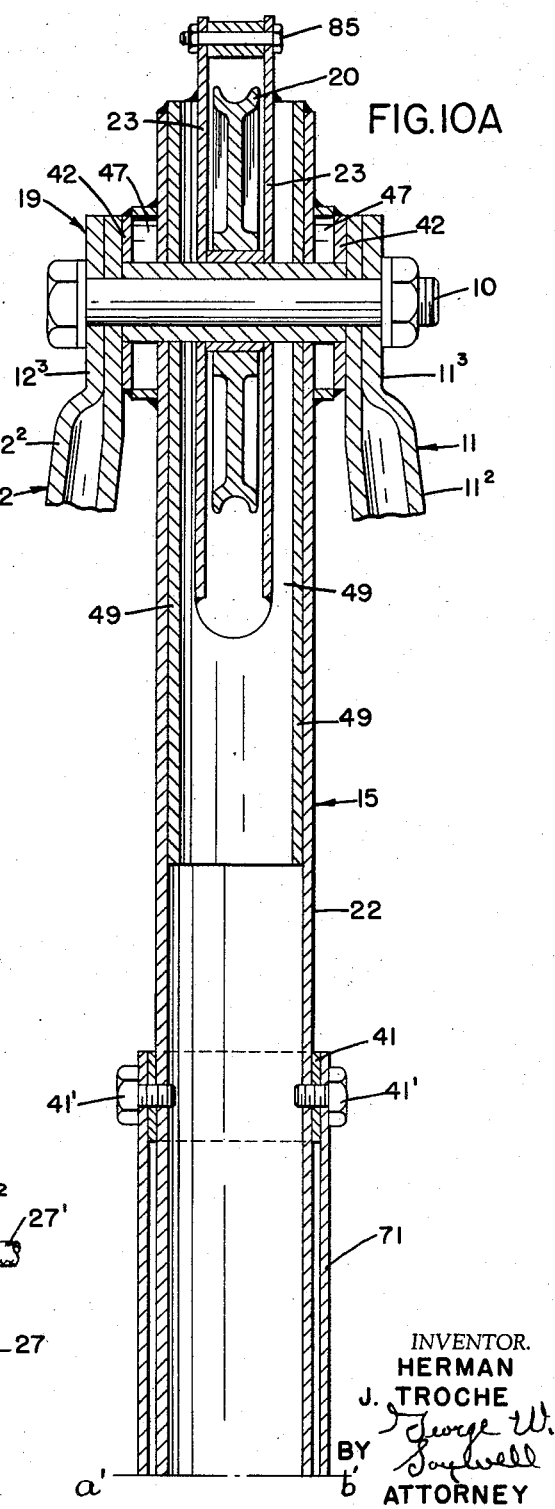
INVENTOR.
HERMAN J. TROCHE
BY George W. Soywell
ATTORNEY

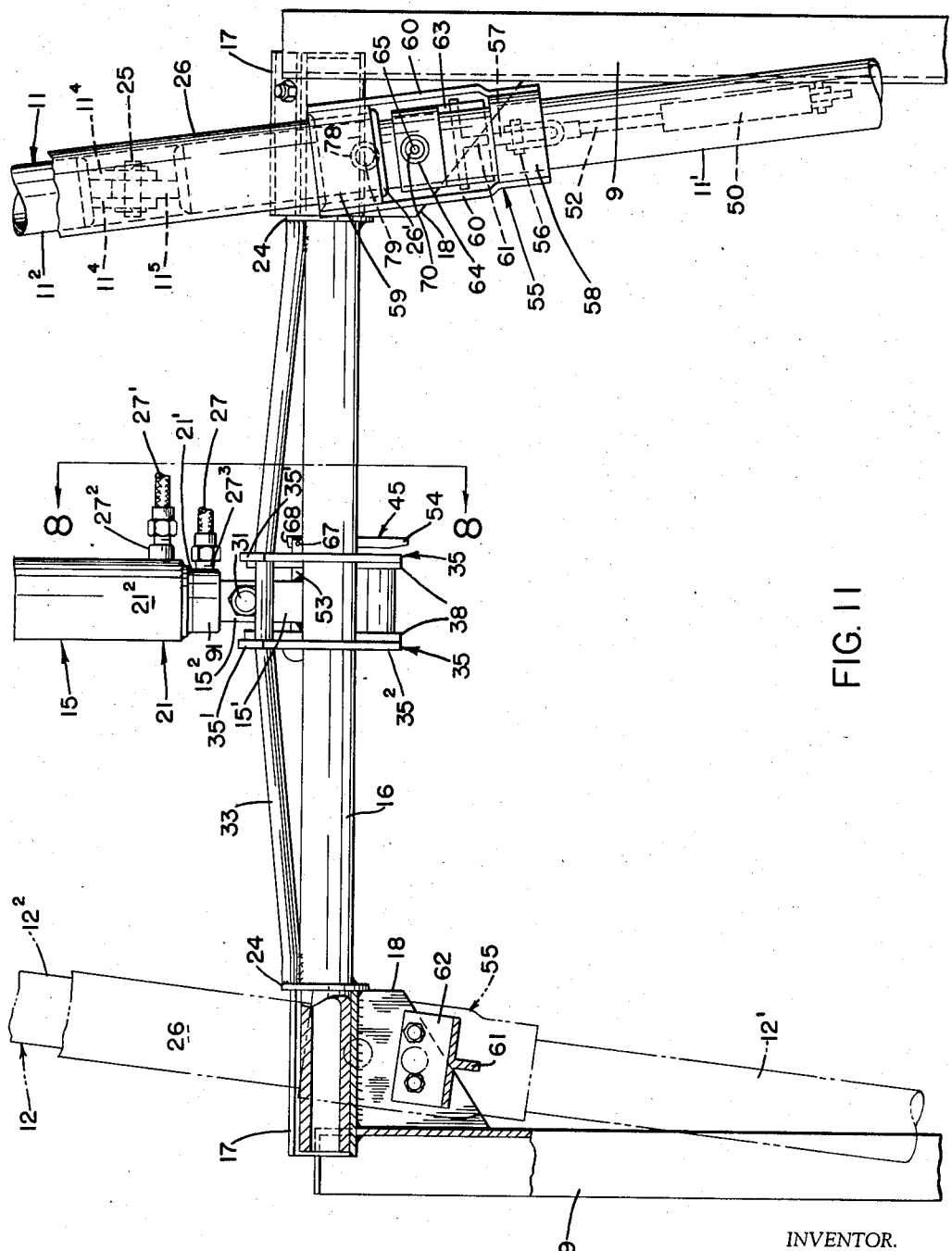

May 26, 1959 — H. J. TROCHE — 2,888,149
DERRICKS
Filed Sept. 25, 1956 — 9 Sheets-Sheet 9

INVENTOR.
HERMAN J. TROCHE
BY
George W. Saywell
ATTORNEY

United States Patent Office 2,888,149
Patented May 26, 1959

2,888,149
DERRICKS

Herman J. Troche, Fairview Park, Ohio, assignor to J. H. Holan Corporation, Cleveland, Ohio, a corporation of Ohio Application September 25, 1956, Serial No. 611,973

7 Claims. (Cl. 212—8)

The invention relates to derricks. More particularly, it relates to hydraulically-actuated tripod derricks stored on, supported by, and operated from trucks, and utilized for the installation and maintenance of utility facilities. The improved derrick has an A-frame consisting of two two-part side legs respectively pivoted at the bottom ends of one part to and adjacent the bottom rear of the sides of the truck, and a middle leg depending from the top portion of the A-frame and consisting, in part, of a hydraulic cylinder of telescoping parts secured at its bottom end to a cross sheave bar journalled at its ends in and adjacent the top of rear truck framing. The middle leg serves to raise and lower the derrick and to effect the working adjustments thereof, and is so connected with the sheave bar as to permit cross-wise pivotal movements of the middle leg relative to the truck.

The derrick side legs each consists of a lower portion automatically lapped with an upper leg portion as the latter is being raised from horizontal storage position on the truck body roof to vertical position. Hydraulically-actuated means are provided for locking the two leg portions together after they have been lapped by the erecting of the upper leg portion. This locking together of the two leg portions is maintained during the working of the derrick outboard from the truck rear. Unlocking of the leg portions can be automatically effected by the same hydraulically-actuated means when it is desired to lower the upper portion of the leg from vertical position thereof to horizontal storage position on the truck body. In storage position the lower leg portion remains upright at the rear of the truck.

An important feature of the invention relates to hydraulically-actuated sleeve structure effecting the aforesaid automatic locking and unlocking of the upper portions with the lower portions of the derrick side legs after the upper portions of these side legs are lifted from horizontal storage position on the truck body into vertical position at the rear of the truck body, or after the derrick has been moved from outboard working position to vertical position preparatory to storing the upper leg portions. This automatic hydraulically-actuated sleeve structure includes safety features therefor hereinafter fully described.

The annexed drawings and the following description set forth in detail certain means exemplifying the inventive structure, such means constituting, however, only one of the various forms in which the principle of the invention may be embodied.

In said annexed drawings:

Figure 3 is a fragmentary top plan of the truck and derrick, the latter being shown in fully extended position rearwardly of the truck;

Figure 4 is a broken side view of the structure shown in Figure 3 with the side legs and the middle leg of the derrick shown in fully extended position in full lines and in an intermediate working position in dot-and-dash lines;

Figure 8:
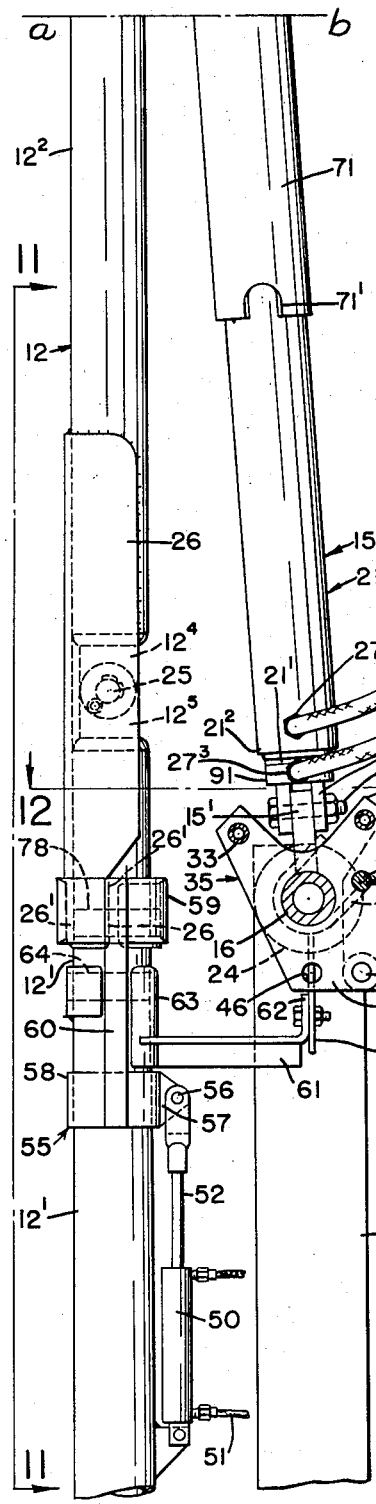
Figure 8A:
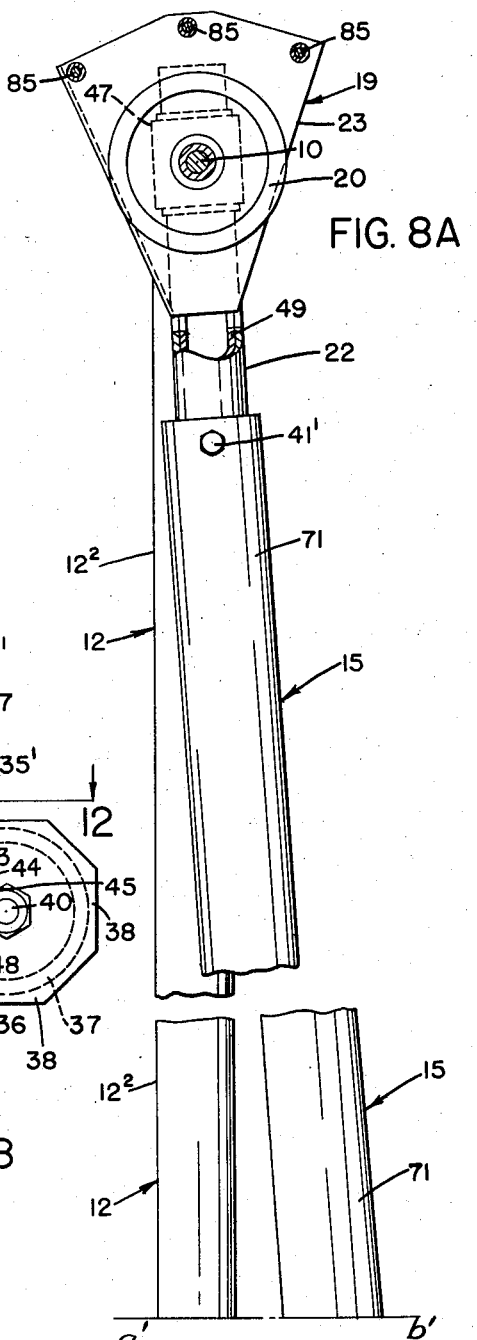
Figure 12:
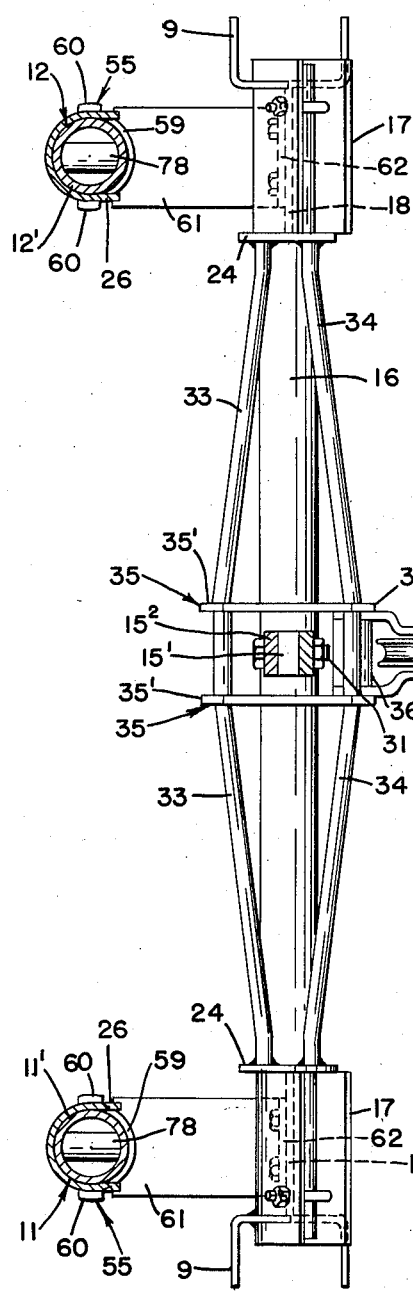
Figure 13:
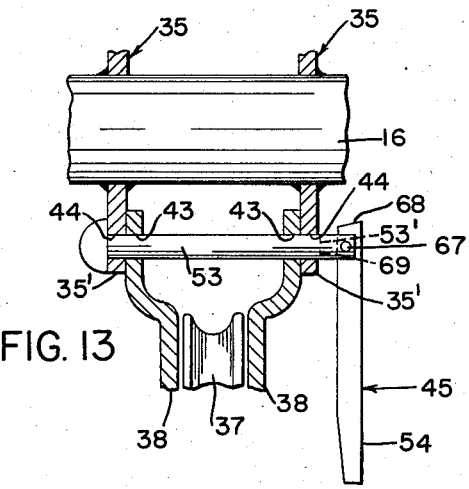
Figure 14:
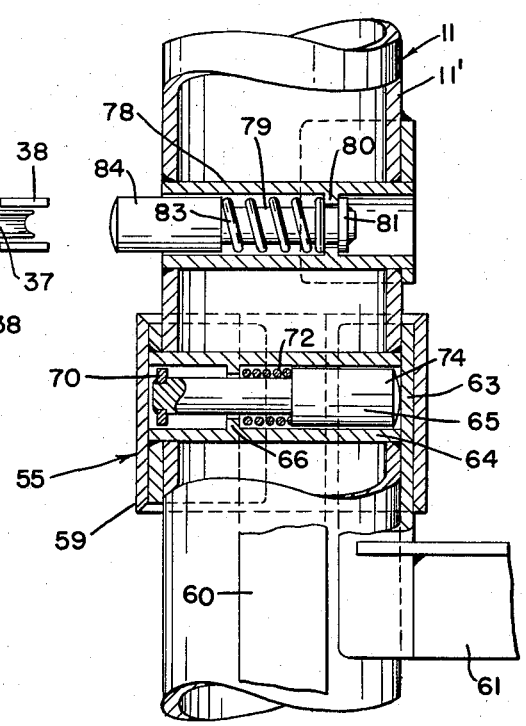

Figures 5 and 5A together constitute a broken side elevation, partially in section and upon an enlarged scale, showing the derrick in storage position, a winch cable sheave being in an idle position preparatory to erecting the derrick, in which preparatory position the sheave depends vertically from the sheave bar. The lower unlocking position of the locking sleeve for the upper and lower leg portions is also shown in Figure 5;

Figure 6 is a fragmentary side elevation, upon an enlarged scale, particularly showing the disposition of the winch cable sheave and certain winch cable sheave and sheave mounting elements, when the derrick is in storage position, this view also showing the position of the automatic sleeve leg-locking means when the derrick is in storage;

Figure 7 is a fragmentary rear elevation, partially in section and upon an enlarged scale, taken from the plane indicated by the line 7—7, Figure 5, the winch cable sheave and its support being shown in the idle depending position of the sheave shown in Figure 5;

Figure 8 and 8A together constitute a broken elevation of the derrick in vertical position, particularly showing the hydraulically-operated leg-locking sleeve and the safety pins therefor in locking position, and also indicating the position of the winch cable sheave at the beginning of the outboard movement of the derrick, Figure 8 being taken from the plane indicated by the line 8—8, Figure 11;

Figure 8B is a showing of a part of the structure shown in Figure 8 in which the hydraulically-operated leg-locking sleeve is in an intermediate position of its path of movement;

Figure 9 is a fragmentary side view, partially in section, of the derrick in an outboard position, particularly showing the positions of the safety pins for the automatic sleeve lock, when the derrick is outboard;

Figures 10 and 10A together constitute a longitudinal section, upon an enlarged scale, of the telescoping middle leg in storage position, this middle leg including a hydraulic cylinder, the view being taken in the plane indicated by the line 10—10, Figures 5 and 5A;

Figure 11 is a fragmentary rear elevation, upon an enlarged scale, partially in section, and taken from the plane indicated by the line 11—11, Figure 8;

Figure 12 is a top plan of the derrick in vertical position, the view being taken in the plane indicated by the line 12—12, Figure 8;

Figure 13 is a detail showing the locked position of a removable locking pin for a winch cable sheave assembly, the latter being in a position depending from the sheave bar which is a sheave position to which it is manually moved from its storage position preliminarily to the lifting of the derrick from storage position; and Figure 14 is an elevation of a part of the lower portion of a derrick side leg and the locking sleeve and safety pins therefor, partially in longitudinal section, and particularly showing the disposition of the automatic sleeve lock safety pins when the derrick is in storage position.

Figures 1, 2:
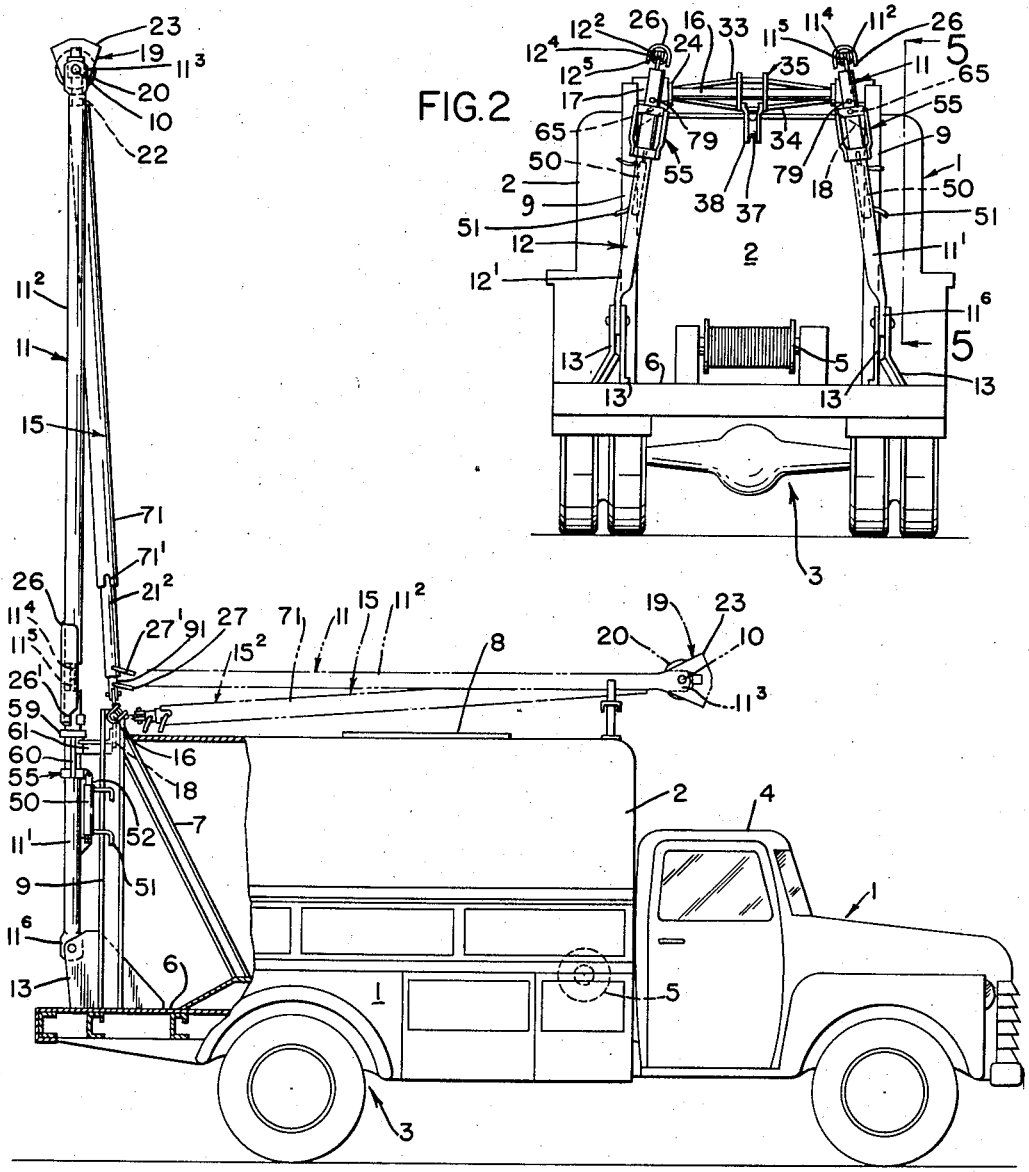
Figure 1 is a broken side elevation of a truck at the rear of the body of which the improved derrick is mounted, the view showing the derrick middle leg and the upper portions of the side legs raised from respective storage positions into vertical positions, and, in dot-and-dash lines, showing the derrick in storage position.
Figure 2 is a rear elevation of the truck and derrick shown in dotted lines in Figure 1.

Referring to the annexed drawings in which the same elements are indicated by the same respective numbers in the several views, the derrick is stored on, carried on, and manipulated from a truck 1, Figures 1, 2 and 4, having a body 2 with a slidable roof section 8, chassis and running gear 3, cab 4, and a working floor 6. Supported by the floor 6 is a winch 5 from which extends a cable 28 playing over a sheave 37, Figure 4, rotatably mounted on a pin 40, Figure 7, and forming part of a sheave assembly whose arms 38 are pivotally mounted on a pin 36 intersecting certain portions $35^2$ of sheave bar plates 35 hereinafter fully described. The sheave assembly 38 is located in three different positions during different positions of the derrick, viz.: (1) storage position, (2) a position preparatory to erecting the derrick, and (3) a position when the derrick is erected and during use of the derrick, as will be hereinafter fully described. A storage position of the sheave 37 is shown in Figure 6. From the sheave 37 and the cable extends to and plays over a sheave 20 of the derrick head 19, Figures 4 and 10A.

The derrick is supported on the truck 1 by framing 9 including braces 7, Figures 1, 2, 3, 4, 5, 8, 9, 11 and 12, mounted at the rear of the truck on the chassis 3, the framing 9 supporting at its upper end right hand and left hand angularly-positioned channel brackets 17 open toward the top and front of the derrick and within which the ends of a sheave bar 16, Figures 5, 8, 9, 11 and 12, are rotatably mounted. The brackets 17 are welded to the tops of vertical side members of the framing 9, Figures 1, 11 and 12, are extended at their bases into these vertical frame members, and are laterally inwardly extended therefrom, Figures 2, 11 and 12. Welded at their upper ends to and depending from the channel brackets 17 are brackets 18, Figures 1, 5, 8, 9 and 11, to which reference will hereinafter be further made.

The derrick, which will be described as if viewed from the rear of the truck and looking toward the front of the latter, has A-frame side legs 11 (right) and 12 (left) and a middle leg 15, Figures 1, 2, 3, 4, 5 and 5A, 8, 9, 10 and 10A, and 11, these side legs 11 and 12 being pivotally secured by flattened bottom portions $11^6$ and $12^6$ thereof between pairs of rearwardly-extending truck brackets 13 secured to the bottom of the truck rear, these A-frame side legs 11 and 12 carrying at flattened top end portions $11^3$ and $12^3$, Figure 10A, the derrick head 19 from which the middle leg 15 pivotally depends. The middle leg 15 which is a two-part telescoping and extensible structure having a hydraulic cylinder as a part thereof is secured at its bottom end to the center of the rotatable sheave bar 16 by bar extension 15', and is also formed and mounted for transverse movement in a manner hereinafter fully described.

The derrick is erected and lowered and is adjusted into working outboard positions by the extension and contraction of the middle leg 15, the latter comprising an outer lower part 21 and a telescoping inner upper part 22, Figures 3, 4, and 5 and 5A, including an operating cylinder tube and housing assembly 71, Figures 10 and 10A. The middle leg 15 is extended and telescoped by oil pressure obtainable from any suitable source and fed to and withdrawn from the middle leg through oil lines 27 and 27', Figures 5, 8 and 10.

The respective upper and lower portions $11^2$—11', $12^2$—12' of the A-frame side legs 11 and 12 have pairs of respective bottom extensions $11^4$—$12^4$, and adjacent overlapping top extensions $11^5$—$12^5$ by which the side leg portions are permanently pivoted together by pins 25, Figures 5, 8 and 11. When the derrick is in vertical position, the lower portions 11' and 12' of the side legs 11 and 12 form rigid rectilinear legs with the respective upper leg portions $11^2$ and $12^2$ by reason of locking sleeves 55 slidable on the lower leg portions, Figures 2, 5, 8, 8B, 11 and 14, an upper tubular part of which encloses the lower ends of channel-shaped splice members 26 which lap the adjacent ends of the respective upper and lower leg portions in this vertical position. The movement of the locking sleeves 55 resulting in this locking together of the upper and lower leg portions is effected by oil pressure fed to cylinders 50, Figures 1, 2, 3, 4, 5, 8 and 9, through an oil line 51, as will be hereinafter fully described.

Other general features of the invention relate to the structure and operation of certain safety features for the sleeves 55; as also the structure and operation of the middle leg 15, Figures 10 and 10A, all of which will be hereinafter fully described in detail.

The transverse sheave bar 16 is provided with annular washers 24 adjacent its ends and welded thereto, Figure 12. Also welded at their ends to the end washers 24 are spaced inclined cross bars 33 and 34, Figures 2, 3, 5, 8, 9, 11 and 12, which intermediate their ends intersect and are welded to a pair of spaced plates 35 welded to and extended at right angles from the sheave bar 16. These spaced plates 35 have, respectively, two arms 35' which are spaced 90° apart and which extend at a 45° angle respectively upon both sides of the plane of a bar extension 15' of the middle leg 15, Figure 5. The plates 35 also have opposite downwardly-extended end portions $35^2$. This bar extension 15' is a bottom end extension of the middle leg 15, Figures 5, 6, 8 and 11, is welded to the central part of the sheave bar 16, and is pivotally secured by a pin 31 between spaced extensions $15^2$ of a bottom plug 91 for the lower end of the lower middle leg part 21, Figures 6 and 10.

When the derrick is in storage position but about to be erected, the cable-directional sheave 37 is manually moved from its storage position shown in Figure 6 to the idle depending position shown in Figures 5 and 7. As the middle leg 15 is hydraulically extended and the derrick is thus erected to vertical position, the sheave 37 and the sheave bracket assembly 38 are automatically moved by the turning of the sheave bar 16 from the idle position shown in Figures 5 and 7 to an upper and forward operating position shown in Figure 8. When the derrick has been lowered and is in storage, the sheave 37 can be manually moved from the depending position shown in Figures 5 and 7 to the storage position shown in Figure 6, and then manually moved back to the depending position shown in Figures 5 and 7 when it is desired again to erect the derrick.

Locking means are provided for the sheave bracket assembly 38 and the plates 35 when moving them from the idle position shown in Figures 5, 7 and 13 to the operating position shown in Figure 8, and from the latter position to the idle position. These locking means are also used after the sheave 37 has been manually moved from idle depending position to storage position but in a set of different registering holes as will be hereinafter explained.

For locking the bracket assembly arms 38 of the sheave 37 to the extensions $35^2$ of the sheave bar plates 35, in any position of the sheave 37, a removable flat type lock pin 45 is utilized which is shown in Figure 13 in an idle depending position of the sheave 37, intersecting holes 43 of the sheave assembly arms 38 and holes 44 of the plates 35. This locking pin 45 is a two-part member, "53" and "54," whose adjacent ends are pivotally secured together by a pin 67. The part 53 of the locking pin 45 which intersects the sheave assembly arms 38 and the plates 35 has a 90° shoulder 69 adjacent one end at the bottom of a slot 53', which shoulder 69 is engageable by a beveled end surface 68 on the depending locking pin part 54, whereby when the pin part 54 is lifted into rectilinear position in alignment with the pin part 53 the pin 45 can be withdrawn from the plates 35 and the sheave assembly arms 38 and used for a locking operation of the bracket assembly 38 and the plates 35 in a different relative position of the sheave 37, as hereinafter explained. Dependent upon the position of the sheave 37, whether in idle depending position shown in Figures 5, 7 and 13, and just described, or in storage position shown in Figure 6, the pin 45 is selectively engaged with different holes in the plates 35 and in the sheave arm assembly 38. It should be understood that the sheave 37 is automatically moved from the idle depending position shown in Figure 5 to the operating position shown in Figure 8, and vice versa, by reason of the turning movement of the sheave bar 16, and thus plates 35 and the sheave assembly 38 turn as a unit, and the locking pin remains in the same holes; whereas, the movements of the sheave 37 from idle depending position shown in Figure 5 to storage position shown in Figure 6, and vice versa, are manually-actuated ones wherein the sheave arm assembly 38 is turned on the pin 36, Figure 7, and the locking pin 45 must be moved from one set of registering holes to another set of registering holes. The aforementioned holes are 44 and 46 in the plates 35, and 43 and 48 in the sheave arms 38, Figures 5, 6, 8, 9 and 13 and holes 46 and 48 are utilized for the locking pin 45 after the sheave 37 has been manually moved to storage position.

Assuming that the sheave is in storage position shown in Figure 6, holes 46 in the plate portions 35² register with holes 48 in the sheave arm assembly 38. The removable locking pin 45 is inserted in these holes 46 and 48 and retains the sheave 37 in storage position. Now, assuming that it is desired to operate the derrick, the locking pin 45 is removed from the holes 46 and 48, and the sheave 37 is turned manually on the pin 36 to the idle position shown in Figures 5, 7 and 13. This movement causes no movement of the sheave bar plates 35 but does cause the holes 44 of the plates 35 to register with the holes 43 of the sheave arm assembly 38, so that the lock pin 45 can be inserted through these holes 43 and 44 as shown in Figure 13 and cause the plates 35 and the sheave arm assembly 38 to turn thereafter as a unit to operating position.

As the derrick is raised from storage position, the consequent turning movement of the sheave bar 16 carries the sheave arm assembly 38 to the operating position shown in Figure 8 and also turns the sheave bar plates 35 into the position therefor shown in said Figure 8. Thus, as the sheave 37 is automatically moved into operating position shown in Figure 8, from the position shown in Figures 5 and 7, the holes 43 in the arms 38 continue to register with the holes 44 in the plate extensions 35' and the lock pin 45 is left engaged in these holes 43 and 44 to turn the sheave 37 with the sheave bar 16. This unit movement persists during all movements of the derrick.

The positions of the sheave 37 shown in broken lines in Figure 4 indicate respectively the sheave position in an intermediate working position of the derrick, and in the fully extended position of the derrick.

Referring particularly to the sleeve means 55 for effecting the automatic locking of the lower and upper leg portions 11'—11², 12'—12² after the derrick is erected to vertical position, attention is directed to Figures 5, 8, 8B, 11 and 14, wherein the leg portions are in separated condition and in storage position of the derrick (Figures 5 and 14); in locked condition and in erect position of the derrick (Figures 8 and 11); and in partially locked condition (Figure 8B), respectively. The piston rod 52 of the cylinder 50 which activates the locking and unlocking movements of the sleeve 55 is pivotally connected at its outer end by a pin 56 to a forward extension 57 of a tubular locking sleeve 55 slidably mounted on the lower leg portion 11'. The locking sleeve 55 is comprised of tubular lower and upper members 58 and 59 which are connected together by a pair of longitudinal side plates 60. As will be noted from a comparison of Figures 5 and 8, oil pressure entering the bottom of the cylinder 50 through the hydraulic line 51 raises the locking sleeve 55 from the position shown in Figure 5 to the position shown in Figure 8. In this latter position the upper tubular member 59 of the locking sleeve 55 surrounds and confines a lower reduced part 26' of the sleeve 26 which latter, in the erect position of the derrick, Figure 7, laps the adjacent ends of the lower and upper leg portions 11'—11². As the upper side leg portions 11² and 12² are lifted from the position shown in Figure 5 to the position shown in Figure 8 by the extending movement of the telescoping parts 21 and 22 of the center leg 15, the sleeves 26 secured to and on the top of the upper leg portions 11² and 12², Figure 5, turn on the pins 25 and their lower portions abut the rear of the upper parts of the lower leg portions 11' and 12'. It is in this position of the sleeve 26 that the tubular locking sleeve 55 is raised and its upper end tubular part 59 is caused to surround the lower reduced end portion 26' of the sleeve 26.

It will be understood that there is a locking sleeve 55 and cooperating elements for each of the A-frame side legs 11 and 12.

There is an aligning or a stop provision for the lower leg portions 11' and 12' of the legs 11 and 12 effective when the derrick is moved from working outboard position to an erect position at the rear of the truck 1. This stop and aligning function is effected by storage plates 61, Figures 5, 6, 8, 9 and 14, which are secured by respective upwardly-extending flanges 62 to the brackets 18 which depend from the channel-shaped end brackets 17. The outer rear end of the plate 61 is an upwardly-extending semi-circular formation 63 which accommodates and thus aligns the inner adjacent front surface of the lower side leg portion 11' as the latter is moved from working position to upright position. When the locking sleeve 55 is in its lower position and the upper portion 11² of the leg is in storage, Figure 5, the upper tubular end 59 of the locking sleeve 55 encloses the upright lower leg portion 11' and the semi-circular formation 63 of the stop plate 61 against which the lower leg portion 11' abuts.

As a safety measure to prevent the automatic locking sleeves 55 from being accidentally disengaged from the splice channel ends 26' and the semi-circular upright stops 63 which receive the lower leg portions 11' and 12', a pair of plungers 65 and 79, Figures 2, 3, 5, 9, 11 and 14, are reciprocably mounted in retainer tubes 64 and 78 welded to and within these lower leg portions, the plungers 65 and 79 respectively tending to protrude, respectively, from the front and rear sides of the leg portions 11' and 12'. This tendency is due to compression springs 72 and 83 upon which these plungers 65 and 79 are respectively mounted. There are retainer tubes 64 and 78, plungers 65 and 79, and springs 72 and 83 for each derrick side leg portion 11' and 12'. Each retainer tube 64 and 78 has an interior shoulder 66 and 80 respectively, Figure 14, and adjacent one face of the tube is a washer 70 and 81 respectively welded to the respective plungers 65 and 79. Secured to the opposite faces of the respective shoulders 66 and 80 are the inner ends of the compression springs 72 and 83 positioned between the inner faces of the tubes 64 and 78 and the outer peripheral surfaces of the plungers 65 and 79, the outer ends of the springs 72 and 83 abutting the inside faces of enlarged outer end protruding portions 74 and 84 of the respective plungers 65 and 79.

The outer protruding ends of the plungers 65 and 79 respectively act at different stages of derrick erection and operation as stops for the upper end tubular portions 59 of the locking sleeves 55 and prevent said tubular portions 59 from being accidentally disengaged from the stops 63 and the lower ends 26' of the splice channels 26. In the working outboard position of the derrick, Figure 9, the plungers 65 protrude forwardly of the leg portions 11' and 12' below the top tubular ends 59 of the locking sleeves 55 and prevent the locking sleeves from accidentally moving downwardly, and the plungers 79 are compressed rearwardly of these leg portions by the lower ends 26' of the locking sleeves 26. In the storage position of the derrick, Figures 1, 5 and 14, the plungers 65 are compressed at the front surfaces of the leg portions 11' and 12' by the stops 63, and the plungers 79 protrude rearwardly from the rear surfaces of the leg portions 11' and 12' above the members 59 and act as stops against the accidental upward movement of the sleeves 55. During the movements of the sleeve 55 effecting its locking and unlocking, Figure 8B, both plungers 65 and 79 are held in compressed position and the upper tubular end 59 of this sleeve 55 is engaged both with the lower end 26' of the splice channel 26 and with the stop 63, as will be hereinafter explained. The reasons for these several positions will be hereinafter fully set forth.

Inasmuch as these several elements are positioned the same and function the same in each side leg, they will be described for one side leg only.

When the derrick is in storage, Figures 5 and 14, the upper tubular end 59 of the locking sleeve 55 is over the semi-circular upright stop part 63 of the bracket 61 and the lower portion 11' of the derrick side leg is held in firm position. Plunger 65 is held by the semi-circular upright stop 63 in compressed condition within the lower leg portion 11', and plunger 79 above the upper tubing end 59 of the locking sleeve 55 is extended. As stated, this plunger 79 prevents the locking sleeve 55 from being accidentally moved upwardly far enough to disengage the tube end 59 thereof from the upright leg aligner and stop part 63. At this time the leg lapping channel 26 is disposed as shown in Figure 5.

When the derrick is erected to vertical position, the plunger 79 is compressed by the lower end 26' of the splice channel 26 engaging the lower leg portion 11' and then both of the plungers 65 and 79 are compressed.

Then the cylinder 50 is operated to raise the tubular locking sleeve 55 to the position shown in Figure 8. This action releases the upper end 59 of the locking sleeve 55 from stop 63 when sleeve 55 has been sufficiently raised. The lower end 26' of the lapping channel 26 is then held by the upper tubular formation 59 of the locking sleeve 55. The plunger 65 is still held in the leg portion 11' by the stop 63. In the meantime plunger 79 is held in compressed position against the leg lower portion 11' by the splice channel 26.

As the locking sleeve 55 is being moved from one position to the other, it is always partially engaged with both the reduced end portion 26' of the splice channel 26 and the semi-circular stop 63, Figure 8B, until the locking or unlocking action has been completed.

As the derrick is moved from vertical position outboard, Figure 9, the pin 65 moves away from the stop channel 63 and is allowed to protrude outwardly and forwardly of the leg 11, Figure 9, in which position it prevents the locking sleeve 55 from dropping and becoming accidentally disengaged from the splice channel 26. The pin 65 remains in this position until the derrick is again moved forwardly to vertical position.

What has been described as the sequence of actions in erecting the derrick from storage position to vertical position and then outboard is the same sequence in reverse in moving the derrick from working position to vertical position and thence into storage.

A general number for the derrick head is "19," Figure 10A, and this head includes flattened upper ends 11³ and 12³ of the upper leg portions 11² and 12² of the derrick side legs 11 and 12 secured together by a head pin 10 upon which is mounted the head sheave 20. Guide plates 23 peripherally connected together by spacer pipes and bolts 85 are mounted on the head pin 10 and align the faces of the sheave 20. The head pin 10 carries a depending insert tube 49 mounted thereon interiorly of the upper section 23 of the middle leg 15, this insert tube 49 being welded at its upper end to the guide plates 23 and the upper end of the upper leg section 22. Spacers 47 and washers 42 welded thereto are interposed between the upper flattened side leg ends 11³ and 12³ and the outside face of the upper section 22 of the center leg 15, the spacers 47 being welded to the leg section 22.

Surrounding and extending above the lower middle leg section 21, Figures 10 and 10A, and having upon one side a lower end semi-elliptical cutout 71' embracing a port 27² of a fluid line 27' is a cover cylinder 71 slidable upon the exterior surface of the lower middle leg section 21 and secured at its upper end by a tubing collar 41 and bolts 41' to the upper middle leg section 22 substantially above the bottom end of the latter which extends materially downwardly into the cover cylinder 71. The lower middle leg section 21 has a double wall comprised of two concentric spaced tubular members, inner member 21' and outer member 21², forming an intermediate annular oil chamber 86 communicating at its lower end with the fluid port 27². There is a second fluid line 27 communicating through a port 27³ with the interior of the tubular inner member 21' below the head 39' of a piston rod 39 hereinafter more fully mentioned. The inner wall member 21' provides a chamber 89 between the piston head 39' and an upper stuffing box 76 also hereinafter more fully mentioned. The upper end of the inner wall member 21' is formed with ports 73 establishing communication between the chamber 89 and the annular oil chamber 86. The bottom ends of the cylinders 21' and 21² are welded together, and in the bottom end of the cylinder 21' is welded a bottom cylinder plug 91 having the bottom extending spaced links 15² pivotally connected by the pin 31 to the middle leg extension bar 15', Figure 9, which in turn is welded to the sheave bar 16.

Extending centrally and longitudinally of the chamber 89 is a piston rod 39 extended at its upper end beyond the chamber 89 and having the lower head 39' slidable upon the inner wall 21' of the lower middle leg section 21, the upper extending end of this piston rod 39 centrally intersecting a stuffing box 76 and allied structure of dimensions to provide a sealing medium within the movable cover cylinder 71. The stuffing box structure 76 is secured to and seals the upper ends of the two walls 21' and 21² forming the lower middle leg section 21, also sealing the top of the oil passage 86.

The stroke of the piston rod 39 effected by oil under pressure entering through the line 27 is limited by a sleeve 32 secured to the inner end of the piston head 39' and upstanding in the chamber 89, this sleeve 32 in its upper movement encountering the stuffing box structure 76.

Engaged with the top of the piston rod 39 is an upstanding threaded extension 77 and engaging a base member 90 closing the bottom end of the middle leg upper section 22 is a depending extension 82, these two extensions 77 and 82 being adjustably secured together by a connector nut 75, thus effecting the telescoping upward and downward movements of the upper middle leg section 22, by reason of the piston stroke, and consequently the extending and retracting movements of the derrick head 19.

The operations of the derrick structure hereinbefore described are as follows:

Assuming that the derrick is in storage shown in Figures 5 and 14, with the sheave 37 in the storage position shown in Figure 6, the plungers 65 in the side legs 11 and 12 are in compressed position between the lower parts of the legs 11 and 12 and the surfaces of the semi-circular stops 63. The plungers 79 are in extended position above the upper tubular ends 59 of the locking sleeves 55. These lock sleeves 55 are in their lowermost position and their top tubing ends 59 surround stops 63, thus holding the lower portions 11' and 12' of the derrick legs in firm position. The extended positions of plungers 79 prevent any accidental upward movements of the locking sleeves 55 which would disengage them from the stops 63. The lock pin 45 is in the required holes 46 and 48 for holding the sheave 37 in storage position. This lock pin 45 is removed and the sheave arm assembly is manually swung on the pin 36 into the idle depending position shown in Figure 5, and the lock pin 45 secured in the holes 43 of the sheave arm assembly 38 and the registering holes 44 in the arms 35' of the plates 35, Figure 13.

Fluid pressure is then applied through line 27, Figure 10, to the piston head 39' of the middle leg 15 which extends the upper middle leg cylinder part 22 and raises the derrick to vertical position, Figure 8. This action causes the lower ends 26' of the leg lapping channels 26 to engage the lower portions 11' and 12' of the side legs 11 and 12 and compress plungers 79. This movement of the derrick from storage position to upright position has effected through the sheave bar 16 the movements of the sheave 37, the bars 33 and 34, and the bracket plates 35 from the respective positions shown in Figure 5 to the positions shown in Figure 8. Then fluid pressure is applied to cylinders 50, Figures 5 and 8, and locking sleeves 55 are moved upwardly far enough to disengage their upper tubing ends 59 from stops 63. Then further extension of the derrick middle leg 15 moves the side legs 11 and 12 away from stops 63 and permits plungers 65 to become extended under the action of the compression springs 72. These plungers 65 are below the upper tubing ends 59 of the locking sleeves 55 and prevent the latter from becoming accidentally disengaged from the lower reduced end portions 26' of the lapping channels 26 when the derrick is in outboard working position.

As the locking sleeves 55 are being moved from one position to the other, Figure 8B, they are always partially engaged with both the reduced end portions 26' of the splice channels 26 and with the stops 63 until the movement of the locking sleeves 55 has been completed, thereby avoiding any accidental disengagement of the spliced leg portions. During these movements of the locking sleeves 55, both pairs of plungers 65 and 79 are compressed.

What I claim is:

1. A derrick for trucks comprising a frame having upwardly-converging side legs; a truck body, the upper contracted end of the frame supporting a pulley over which a cable from a winch on the truck body is adapted to pass, a middle leg pivotally depending from the contracted end of the frame, a transverse pivot bar rotatably mounted adjacent its ends on and adjacent the upper end of the truck body, said middle leg being secured adjacent its bottom end to the pivot bar and including a double acting hydraulic cylinder, the side legs each comprising a top portion lying in storage on the truck body and a bottom portion pivotally secured in fixed position to the truck body, means for pivotally securing together said top and bottom leg portions adjacent their respective bottom and top ends, a splice channel secured to the top leg portion and extended longitudinally outwardly therefrom, said splice channel lapping and enclosing the adjacent ends of the bottom and top portions of the side leg when the top portion of the latter is erected, a movable locking sleeve for the splice channel having vertically-spaced connected parts enclosing and longitudinally slidable on the bottom leg portion, a hydraulic cylinder for moving the locking sleeve, a leg-aligning stop mounted on the truck body and receiving and partially enclosing a part of the bottom portion of the side leg when the derrick is moved from outboard position to substantially vertical position, the upper part of the locking sleeve enclosing the leg-aligning stop when the locking sleeve is in its extreme lower position and said upper part of the locking sleeve enclosing the lower end of the splice channel when the locking sleeve is in its extreme upper position, said upper part of the locking sleeve enclosing, in part, both the leg-aligning stop and the lower end of the splice channel when the locking sleeve is in intermediate positions in its path of movement, a pair of upper and lower spring-mounted safety pins mounted in the bottom portion of the side leg and respectively tending to protrude rearwardly-outwardly and forwardly-outwardly thereof, the upper of said safety pins being in protruding position above the upper part of the locking sleeve when the latter is in the lower part of its path of movement and the splice channel is in non-leg-lapping position, and being compressed by the splice channel when the latter is in its leg lapping position, and the lower of said safety pins being in protruding position below the upper end of the locking sleeve when the latter is in the upper part of its path of movement and the derrick is outboard and being compressed by the leg-aligning stop when the derrick is inboard.

2. A derrick for trucks comprising a frame having upwardly-converging side legs; a truck body, the upper contracted end of the frame supporting a pulley over which a cable from a winch on the truck body is adapted to pass, a middle leg pivotally depending from the contracted end of the frame, a transverse pivot bar rotatably mounted adjacent its ends on and adjacent the top of the truck body, spaced extensions secured to the bottom end of the middle leg, a bar extension secured to the pivot bar, means pivotally securing the bar extension to and between the spaced extensions for movement of the middle leg in a plane transverse to the plane of its movements to erecting and storage positions, the middle leg including a double acting hydraulic cylinder, the side legs each comprising a top portion lying in storage on the top part of the truck body and a bottom portion pivotally secured in fixed position to and adjacent the bottom of the truck body, a pin for pivotally securing together said top and bottom leg portions adjacent their respective bottom and top ends, a splice channel secured centrally of its length to the top leg portion and extended longitudinally outwardly therefrom, said splice channel lapping and enclosing the adjacent ends of the bottom and top portions of the side leg when the top portion of the latter is erected, a movable locking sleeve for the splice channel comprising tubular spaced and connected end parts enclosing and longitudinally slidable on the bottom leg portion, a hydraulic cylinder for moving the locking sleeve, a leg-aligning stop mounted on the truck body and receiving and partially enclosing a part of the bottom portion of the side leg when the derrick is moved from outboard position to substantially vertical position, the tubular upper end of the locking sleeve enclosing the leg-aligning stop when the locking sleeve is in its extreme lower position and said upper end of the locking sleeve enclosing the lower end of the splice channel when the locking sleeve is in its extreme upper position, said upper end of the locking sleeve enclosing, in part, both the leg-aligning stop and the lower end of the splice channel when the locking sleeve is in intermediate positions in its path of movement, a pair of upper and lower spring-mounted safety pins mounted in the bottom portion of the side leg and respectively tending to protrude rearwardly-outwardly and forwardly-outwardly thereof, the upper of said safety pins being in protruding position above the upper end of the locking sleeve when the latter is in the lower part of its path of movement and the splice channel is in non-leg-lapping position, and being compressed by the splice channel when the latter is in its leg lapping position, and the lower of said safety pins being in protruding position below the upper end of the locking sleeve when the latter is in the upper part of its path of movement and the derrick is outboard and being compressed by the leg-aligning stop when the derrick is inboard.

3. A derrick comprising a frame having upwardly-converging side legs, a truck body, the upper end of the frame supporting a pulley over which a cable from a winch on the truck body is adapted to pass, a middle leg pivotally depending from the frame, a transverse pivot bar rotatably mounted on the truck body, said middle leg being secured adjacent its bottom end to the pivot bar and including a double acting hydraulic cylinder, the side legs each comprising a generally horizontal top portion and a generally vertical bottom portion in the storage position of the derrick, said leg portions being pivotally secured together at adjacent ends to form a rectilinear leg formation in the upright position of the top portion of the side leg, the bottom leg portion being pivotally mounted adjacent its lower end on the truck body, means secured to one leg portion and lapping the two leg portions to form said rectilinear leg formation when the top portion of the leg is erected to upright position, means vertically slidable on the bottom leg portion for locking the lapping means to the rectilinear leg formation, a pair of vertically-spaced safety pins spring-mounted in the bottom leg portion and tending to protrude therefrom, said safety pins when protruding preventing the accidental displacement of the locking means in the respective unlocking and locking positions of the locking means, means for holding one of said safety pins in compressed condition in an upper locking position of the locking means, means for holding the other of said safety pins in compressed condition in a lower unlocking position of the locking means, and means for sliding the locking means.

4. A derrick, characterized as in claim 3, in which there is a stop and leg-aligning channel mounted on the truck body and encountered by the bottom leg portion when the derrick is moved inboard, in which one of the safety pins protrudes from the bottom leg portion above the locking means when the derrick is in storage position, thus preventing the accidental raising of the locking means, and the other safety pin protrudes below the locking means when the derrick is outboard, thus preventing the accidental lowering of the locking means, and in which the lapping means compresses said one safety pin, and the stop and aligning channel compresses said other safety pin.

5. A derrick, characterized as in claim 4, in which the stop and leg-aligning channel acts as such for the bottom portion of the side leg when the latter is moved from outboard to inboard position, the lower safety pin being compressed by the channel when the leg is in storage position, and in which the locking means is in engagement with the channel except in the uppermost position of the locking means, the upper safety pin being compressed by the lapping means in the lapping position of the latter, the locking means being in engagement with the lapping means except in the lowermost position of the locking means, whereby the locking means are in engagement both with the channel and the lapping means except in the lowermost and uppermost positions of the locking means.

6. A derrick storable on and usable from a support comprising supporting legs each having a generally horizontal top portion and a generally vertical bottom portion in the storage position of the derrick, said leg portions being pivotally secured together at adjacent ends to form a rectilinear leg formation in the upright position of the leg top portion, the bottom leg portion being pivotally mounted adjacent its lower end on the support, means secured to one leg portion and lapping the two leg portions when the top leg portion is erected to upright position, means for effecting the erecting and lowering of the top leg portion and for effecting derrick adjustments and work operations, means mounted on, and movable relatively to, a leg portion for locking the lapping means to the rectilinear leg formation, means for moving the locking means, the locking means including a pair of spaced pins spring-mounted in a leg portion and tending to protrude therefrom respectively to prevent disengaging movements of the locking means, the lapping means compressing one pin to inoperative position in an outboard position of the derrick, and a leg-stop member mounted on the support and compressing the other pin to inoperative position in a storage position of the derrick.

7. A derrick, characterized as in claim 6, in which the lapping means is secured to the top leg portion, in which the locking means are mounted on, and movable relatively to, the bottom leg portion, in which the leg-stop member has a leg-aligning portion engageable with the locking means, in which the pair of pins are vertically spaced, in which the locking means are engaged both with the leg-aligning member and the lapping means except in extreme upper and lower positions of the locking means, in which the upper pin is compressed by the lapping means in an outboard position of the derrick, and in which the lower pin is compressed by the leg-stop and aligning member in a storage position of the derrick.

References Cited in the file of this patent

UNITED STATES PATENTS

| | | |
|---|---|---|
| 2,029,484 | Howard et al. | Feb. 4, 1936 |
| 2,551,286 | Poetker | May 1, 1951 |
| 2,581,298 | Roe | Jan. 1, 1952 |
| 2,630,299 | Troche et al. | Mar. 3, 1953 |
| 2,687,809 | Balogh | Aug. 31, 1954 |
| 2,703,634 | Lee | Mar. 8, 1955 |
| 2,707,063 | Gran et al. | Apr. 26, 1955 |
| 2,753,055 | Hall | July 3, 1956 |
| 2,786,581 | Balogh | Mar. 26, 1957 |